United States Patent
Friedrich et al.

(10) Patent No.: US 9,284,948 B2
(45) Date of Patent: Mar. 15, 2016

(54) WIND TURBINE BLADE

(75) Inventors: Michael Friedrich, Silkeborg (DK); Peter Grabau, Kolding (DK)

(73) Assignee: Envision Energy (Denmark) ApS, Silkeborg (DK)

(*) Notice: Subject to any disclaimer, the term of this patent is extended or adjusted under 35 U.S.C. 154(b) by 924 days.

(21) Appl. No.: 13/524,038

(22) Filed: Jun. 15, 2012

(65) Prior Publication Data

US 2012/0321482 A1   Dec. 20, 2012

(30) Foreign Application Priority Data

Jun. 17, 2011   (DK) .................. PA 2011 70309

(51) Int. Cl.
*F03D 7/02*   (2006.01)
*F03D 1/06*   (2006.01)

(52) U.S. Cl.
CPC ............ *F03D 7/0228* (2013.01); *F03D 1/0641* (2013.01); *F05B 2240/301* (2013.01); *F05B 2240/302* (2013.01); *Y02E 10/721* (2013.01); *Y02E 10/723* (2013.01)

(58) Field of Classification Search
CPC .................. F05B 2270/328; F05B 2240/301; F05B 2240/302; F05B 2240/31; F05B 2240/313; F03D 7/022; F03D 7/0224; F03D 7/0228; F03D 7/024; F03D 1/0641; F03D 1/0633; F03D 1/0675; F03D 1/0683

USPC ....................................... 416/132 B
See application file for complete search history.

(56) References Cited

U.S. PATENT DOCUMENTS

| | | | |
|---|---|---|---|
| 4,565,929 A * | 1/1986 | Baskin et al. .................... 290/44 |
| 4,952,119 A * | 8/1990 | Widseth ............................ 416/3 |
| 5,263,846 A | 11/1993 | Smith |
| 5,518,210 A * | 5/1996 | Friberg ......................... 244/215 |
| 7,186,083 B2 * | 3/2007 | Bayly .............................. 416/51 |
| 2004/0201220 A1 * | 10/2004 | Andersen et al. ............... 290/44 |
| 2009/0028705 A1 * | 1/2009 | Meldgaard et al. ............. 416/23 |
| 2009/0148285 A1 * | 6/2009 | Scholte-Wassink ............ 416/23 |
| 2010/0215494 A1 * | 8/2010 | Bech et al. ...................... 416/31 |
| 2011/0038728 A1 * | 2/2011 | Elkin et al. ...................... 416/31 |
| 2011/0211966 A1 * | 9/2011 | Watts et al. ............... 416/223 R |

FOREIGN PATENT DOCUMENTS

| | | |
|---|---|---|
| CN | 101571102 A | 11/2009 |
| FR | 2 569 243 A1 | 2/1986 |
| SE | 0950727 A1 | 5/2011 |

* cited by examiner

*Primary Examiner* — Dwayne J White
*Assistant Examiner* — Joshua R Beebe
(74) *Attorney, Agent, or Firm* — Roberts Mlotkowski Safran & Cole, PC; David S. Safran

(57) ABSTRACT

A blade for a partial pitch wind turbine is described, wherein the blade has a truncated aerodynamic profile provided at the pitch junction of the blade. The truncated trailing edge acts to prevent the formation of a trailing edge gap during pitching between the trailing edges of the inner and outer blade sections of a partial pitch blade, thereby reducing the negative impact of air leakage, etc., when pitching a partial pitch blade.

9 Claims, 4 Drawing Sheets

US 9,284,948 B2

WIND TURBINE BLADE

BACKGROUND OF THE INVENTION

1. Field of the Invention

The present invention relates to a wind turbine blade, in particular to a partial pitch wind turbine blade.

2. Description of Related Art

A wind turbine blade generally comprises an airfoil shaped profile having a relatively rounded leading edge and a relatively narrow trailing edge, the blade having a suction side (exposed to relatively low air pressure) and a pressure side (exposed to relatively high air pressure).

US patent application No. 2009/0148285 by Scholte-Wassink assigned to GE Energy discloses a wind turbine with a multi-section blade, where the outer section can be pitched relatively to the inner section. A pitch control assemble for an airplane wing is disclosed in U.S. Pat. No. 5,263,846.

FIG. 1 shows an enlarged pitch junction section of a partial pitch wind turbine blade. A partial pitch wind turbine blade 100 comprises an inner blade section 102 and an outer blade section 104 coupled together at a pitch junction, via a pitch system 106. The outer blade section 104 is operable to be pitched relative to the inner blade section 102 by rotation of the pitch system 106. The pitch angle of the outer blade section 104 can be controlled to regulate the operation of the wind turbine, by pitching the outer blade section 104 into or out of the wind direction at the turbine.

With reference to FIG. 2, one feature of partial pitch blades which contributes to efficiency losses in blade performance is the creation of a gap between the trailing edges of the adjacent blade sections, when projected along the longitudinal axis of the blade. In FIG. 2, the inner and outer blade section 102,104 have common leading edge 108, and respective trailing edges 110a,110b, with the pressure side of the overall blade 100 indicated at 112 and the suction side of the overall blade 100 indicated at 114. When the outer blade section 104 is pitched relative to the inner blade section 102, a gap (indicated at 116) is formed in the general blade profile between the two trailing edges 110a, 110b, when seen along the length of the blade 100.

The presence of this trailing edge gap 116 results in air leakage from the pressure side 112 of the blade 100 to the suction side 114, as gap 116 means that there is no barrier between the pressure side of the outer blade section 104 and the suction side of the adjacent inner blade section 102.

Sealing of a gap between adjacent parts of a wing of an airplane has been disclosed in U.S. Pat. No. 5,518,210 by Friberg assigned to McDonnel Douglas Corp. D1 describes a wing where seal plates and attached to the airfoil so that the stream-wise gaps created by the deflected aileron are covered. Prevents airflow leakage through gaps between surface and aerofoil to reduce aerodynamic drag and improve flight efficiency.

SUMMARY OF THE INVENTION

It is an object of the invention to provide a partial pitch blade design which reduces the negative impact of such trailing edge gaps during wind turbine operation.

Accordingly, there is provided a partial pitch wind turbine blade of at least 35 metres length, the wind turbine blade having an aerodynamic airfoil profile with a leading edge and a trailing edge, the wind turbine blade comprising:

an inner blade section; and an outer blade section, the blade sections coupled at a pitch junction such that the outer blade section is pitchable relative to the inner blade section, wherein the wind turbine blade comprises a truncated airfoil profile provided at said pitch junction, wherein the truncated profile is provided at the trailing edge.

A truncated profile at the pitch junction acts to reduce or prevent the formation of a gap between the trailing edges of the inner and outer blade sections when looking along the longitudinal direction of the blade profile, referred to as a trailing edge gap. Such a gap is caused when the surface of the pressure side of one of the blade sections intersects with the surface of the suction side of the other blade section, thereby forming a gap between the trailing edges of the adjacent blade sections, when seen along the longitudinal direction of the blade. Preventing the formation of such a trailing edge gap stops the creation of vortices at the pitch junction, and prevents air leakage from the pressure side of the blade to the suction side of the blade due to the presence of the gap.

For example, said truncated airfoil profile is arranged such that, when projected along the longitudinal axis of the blade, the surface of the pressure side of a first of said blade sections intersects with the surface of the suction side of a second of said blade sections for a pitch angle of the outer blade section greater than a pre-defined angle to prevent the formation of a trailing edge gap at the pitch junction between the trailing edges of the blade sections for pitch angles below said pre-defined angle.

The truncation at the pitch junction is dimensioned such that the trailing edge gap or profile gap is prevented from forming for an initial pre-determined range of pitch angles. If this pre-determined range of angles covers the most likely pitch angles for the predicted wind conditions for the turbine, then the inefficiencies created by tip losses, etc., present at the trailing edge gap do not occur for most of the total energy produced by the wind turbine.

Typically, said pre-defined pitch angle is between 4 and 12 degrees, for example between 6 and 10 degrees or 8 degrees or approximately 8 degrees.

Thus, for angles between 0 degrees pitch and the pre-defined pitch angle, for example 8 degrees pitch, there will be no crossover between the surface side of one section and the pressure side of the other, preventing the formation of a trailing edge gap and any associated vortices, etc. Preferably, the trailing edge gap is prevented from being formed for any pitch angle between a positive and negative value of the pre-defined pitch angle, for example between −8 degrees to +8 degrees.

For example, said inner blade section and said outer blade section comprise a truncated blade profile at said pitch junction, said airfoil profile truncated at the trailing edge of said profile, and wherein said truncated trailing edge is arranged such that when said outer blade section is pitched relative to said inner blade section, the truncated trailing edge surface of said outer blade section projected along the longitudinal axis of the blade intersects the truncated trailing edge surface of the inner blade section.

In this embodiment, both the inner and outer blade sections comprise truncated portions, preventing the formation of trailing edge gaps when pitched. The intersection or overlap between the edge surfaces ensures that a gap will not be formed when the blades are pitched.

For example, said truncated trailing edge is arranged such that said projected intersection of said truncated trailing edge surfaces occurs for when said outer blade section is pitched at a pitch angle of between 0 and 10 degrees, for example between 0 and 8 degrees.

This covers the majority of operating conditions of the wind turbine, and the greatest portion of annual energy consumption. Intersection may cover where the edge surfaces are completely in line, or where they cross at one point along the surface height as seen from an end of the turbine looking along the longitudinal direction of the turbine.

For example, the inner blade section comprises a truncated blade profile at said pitch junction truncated at the trailing edge of said profile, and the outer blade section comprises an untruncated blade profile at said pitch junction; or the inner blade section comprises an untruncated blade profile at said pitch junction, and the outer blade section comprises a truncated blade profile at said pitch junction truncated at the trailing edge of said profile;

wherein the truncated trailing edge surface is arranged such that when said outer blade section is pitched relative to said inner blade section, when projected along the longitudinal direction of the blade, the surface of said truncated trailing edge is intersected by the surface of the untruncated blade profile.

In this embodiment, only one of a blade's inner or outer blade sections is truncated. The truncation is arranged such that the trailing edge of the untruncated section will overlap with the surface of the truncated trailing edge, to prevent the formation of a trailing edge gap. Depending on which blade section is truncated, and on the direction of pitch, the surface of the truncated trailing edge may be intersected by the pressure side surface or the suction side surface of the untruncated section. For example, the overlap between surfaces at least occurs for outer blade section pitch angles of less than 8 degrees, i.e. to ensure that the overlap/intersection occurs for the majority of total energy production for the turbine.

In one embodiment, said inner blade section comprises a truncated airfoil profile at said pitch junction.

In such an embodiment, advantageously, said inner blade section comprises a truncated blade profile and an untruncated blade profile, wherein the chord length of said truncated blade profile is substantially equal to the chord length of the adjacent untruncated blade profile of said inner blade section.

If the inner blade section is truncated, advantageously, the truncation occurs adjacent the pitch junction of the blade, with the inner blade section relatively untruncated when moving away from the pitch junction.

Additionally or alternatively, said outer blade section comprises a truncated blade profile at said pitch junction.

In some embodiments, said outer blade section comprises a truncated blade profile and an untruncated blade profile and a transition zone between said truncated and untruncated blade profiles.

It will be understood that any truncation on the outer blade section may be dimensioned to approximate the chord length of the adjacent inner blade section. Accordingly, if the majority of the outer blade section has a relatively smaller chord that the inner blade section, a transition zone may be used to provide a smooth adjustment of blade profile along the longitudinal length of the blade.

The truncated section may be provided on only one, or both, of the blade sections.

For example, the chord length of the inner blade section at said pitch junction is substantially equivalent to the chord length of the outer blade section at said pitch junction In order to improve the efficiency of the blade design, it is advantageous that there are no substantial discontinuities between the aerodynamic profiles of the adjacent blade sections.

For example, the blade comprises a shell member provided at said pitch junction, wherein said shell member forms an aerodynamic profile having said truncated trailing edge.

The truncated section may be retrofitted to existing blade designs in the form of a shell member or fairing fitted at or around the pitch junction.

For example, said shell member may be provided around at least one of the blade sections, or in a gap between said blade sections at said pitch junction.

In one embodiment, said truncated airfoil profile provided at said pitch junction comprises a chord length of between approximately 4-5 metres at said pitch junction, and wherein the height of the truncated end of said profile is at least 30 centimetres at said pitch junction.

Preferably, at least one of the blade sections comprises at the trailing edge a truncated blade profile at said pitch junction, wherein said truncated profile extends from said pitch junction a distance equivalent to between 2% and 50%, for example between 5% and 25% or between 5% and 15% or 10% of the total longitudinal length of said at least one blade section.

In embodiments where the inner blade section comprises a truncated profile, preferably the truncation longitudinally extends along said inner blade section from said pitch junction a distance substantially equivalent to between 2% and 50%, for example between 5% and 25% or between 5% and 15% or 10% of the total longitudinal length of said inner blade section. It will be understood that embodiments may be used wherein the truncation extends along even more than 50% or 70% or 90%, even up to approximately 100% of the longitudinal length of the inner blade section.

In embodiments where the outer blade section comprises a truncated profile, optionally, the truncation longitudinally extends along said outer blade section from said pitch junction a distance substantially equivalent to between 2% and 50%, for example between 5% and 25% or between 5% and 15% or 10% of the total longitudinal length of said outer blade section.

The truncation is optionally provided in the region of the pitch junction with the profiles of the blade sections away from this region being substantially unaltered.

For example, the wind turbine blade aerodynamic airfoil profile has a maximum thickness T and a chord length C from the leading edge of the profile to the trailing edge, and wherein truncation is performed such that T/C is at least 0.1 or at least 0.2 or at least 0.3. For example, in one embodiment, the profile is truncated such that the profile has a maximum thickness of 1.1 metres, and a chord length from the leading edge to the truncated trailing edge of 5 metres.

In one embodiment, said truncated airfoil profile provided at said pitch junction comprises a chord length of between approximately 4-5 metres at said pitch junction, and wherein the height of the truncated end of said profile is at least 30 centimetres at said pitch junction.

Further enhancements may include, but are not limited to, any combination of the following: the entire length of the inner and/or outer blade section may be truncated; the inner blade section profile comprises a stall-controlled blade profile and the outer blade section comprises a pitch-controlled blade profile; the surface area of said inner blade section is substantially equivalent to the surface area of said outer blade section; said inner blade section is approximately ⅓ of the length of the complete wind turbine blade; the wind turbine blade further comprises at least one stall fence provided at said pitch junction; the wind turbine blade further comprises at least one bridging member provided at said pitch junction to substantially cover the space between adjacent blade sections at said pitch junction.

There is also provided a wind turbine comprising a blade according to any of the embodiments as described above.

Such a wind turbine may comprise a turbine tower, a nacelle provided at the top of said tower, a rotor hub rotatably mounted on said nacelle, and at least two wind turbine blades provided on said rotor hub.

Embodiments of the invention will now be described, by way of example only, with reference to the accompanying drawings, in which:

DETAILED DESCRIPTION OF THE INVENTION

Figure 1:
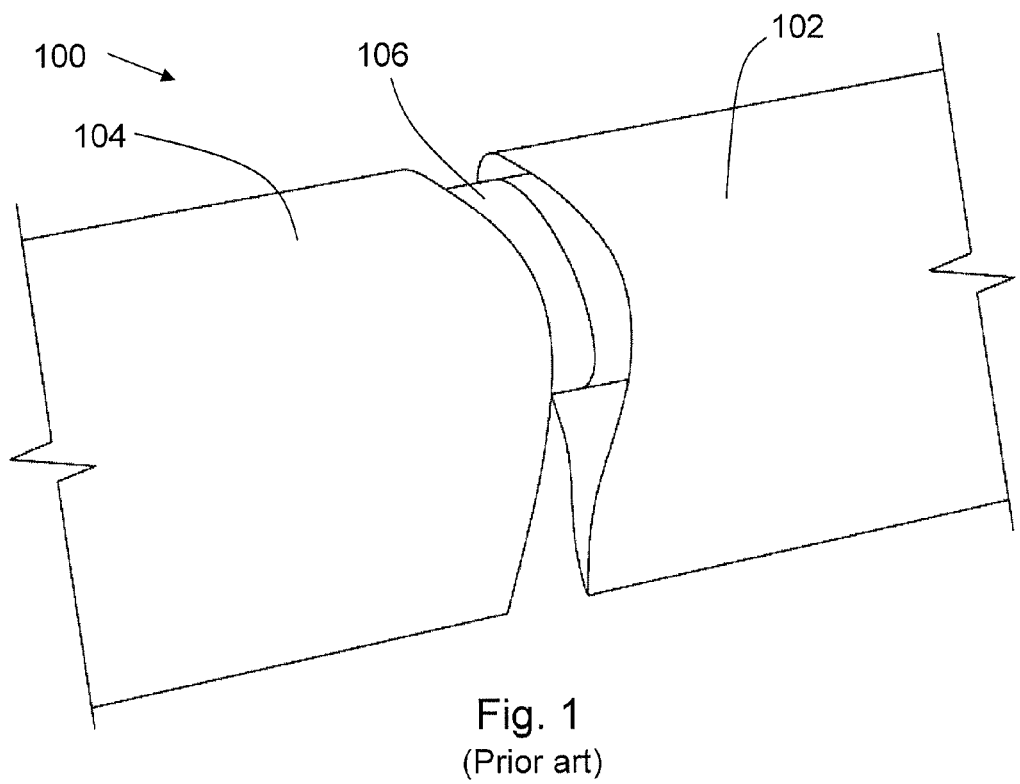
FIG. 1 is an enlarged perspective view of a known pitch junction of a prior art partial pitch blade.
Figure 2:
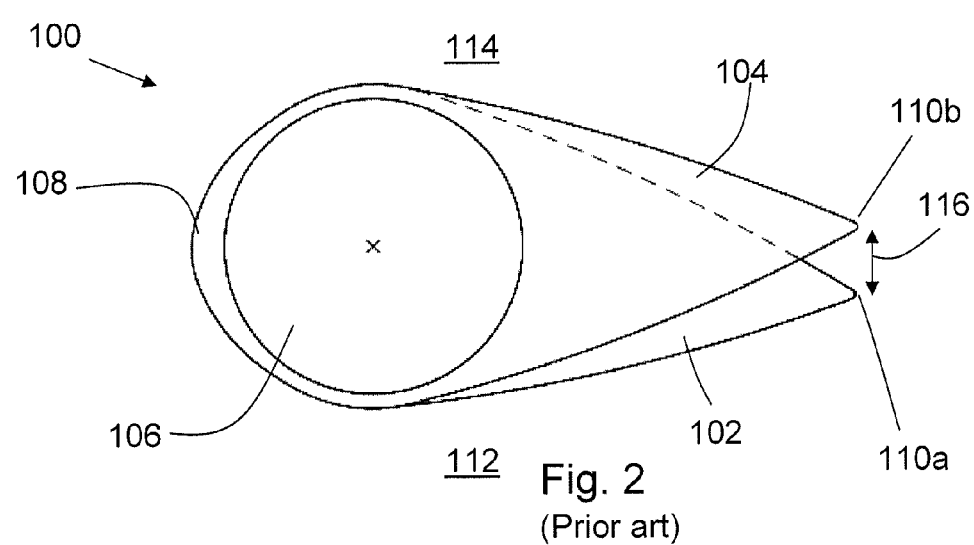
FIG. 2 is a cross-sectional view of the pitch junction of FIG. 1 when pitched.
Figure 3:
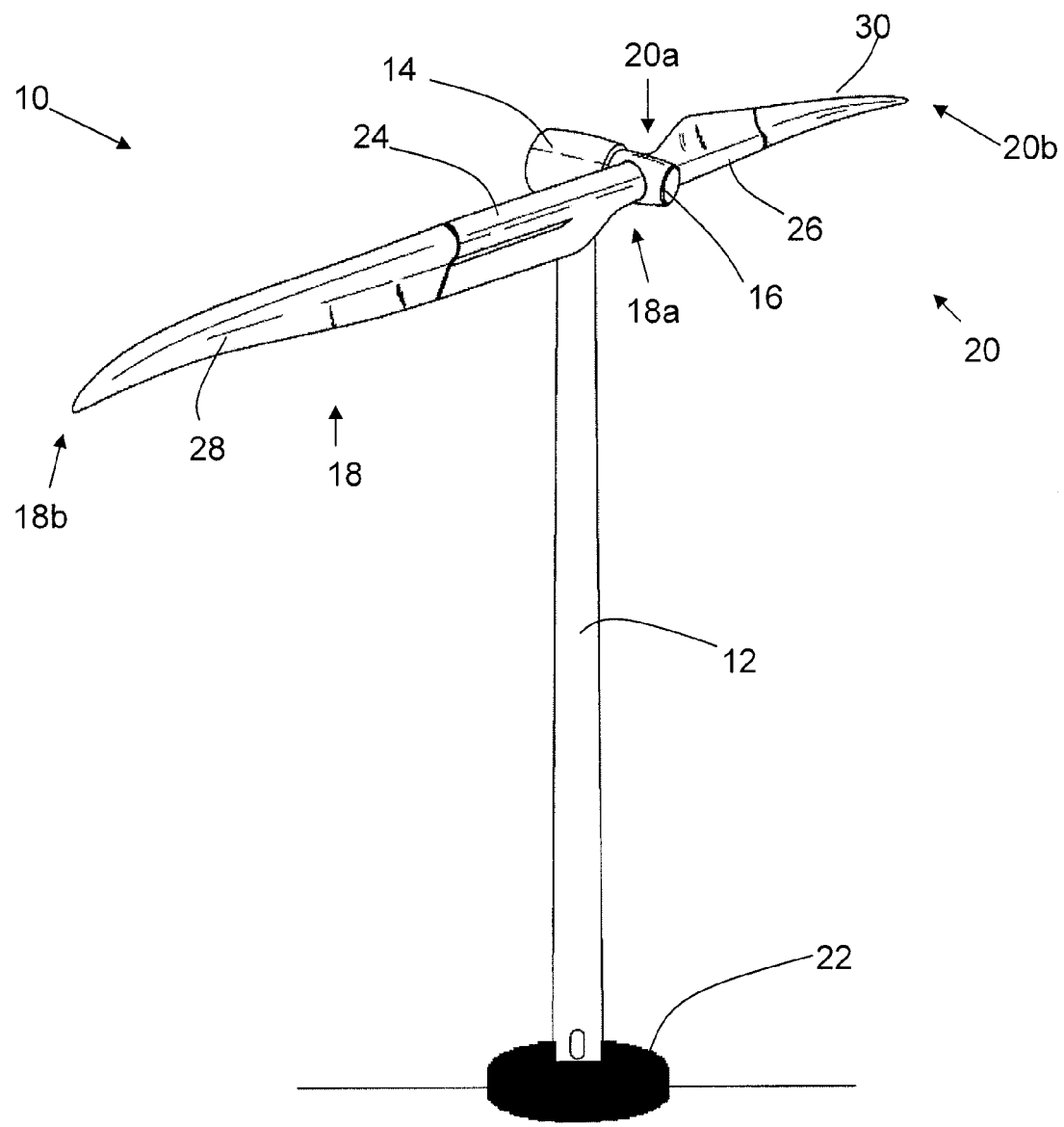
FIG. 3 is a perspective view of a two-bladed partial pitch wind turbine.

With reference to FIG. 3 a partial-pitch two-bladed wind turbine is indicated generally at 10. The wind turbine 10 comprises a wind turbine tower 12, a nacelle 14 provided at the top of said tower 12, and a rotor hub 16 provided at said nacelle 14. First and second partial pitch rotor blades 18,20 are provided on opposite sides of said rotor hub 16. In FIG. 2, the tower 12 is shown provided on a wind turbine base 22, which may comprise any suitable wind turbine foundation. It will be understood that while the illustrated embodiment describes the use of the invention for an on-shore wind turbine, it will be understood that the invention may equally apply to wind turbines for use in an off-shore environment.

The first and second partial pitch rotor blades 18,20 each comprise a blade body having a root end 18a,20a mounted to said rotor hub 16 and a distal tip end 18b,20b. The rotor blades 18,20 comprise respective inner blade sections 24,26 provided at said root ends 18a,20a, and respective outer blade sections 28,30 provided at said tip ends 18b,20b. The rotor blades 18,20 further comprise a pitch system (not shown) provided in each blade at the junction between the inner blade sections 24,26 and the outer blade sections 28,30.

The pitch system is operable to pitch the outer blade sections 28,30 relative to the inner blade sections 24,26. In FIG. 3, the rotor blades 18 are shown unpitched (i.e. the outer blade sections 28,30 are pitched at a 0 degree pitch angle). It will be understood that the inner blade sections 24,26 and the outer blade sections 28,30 comprise a substantially circular end section for coupling to corresponding circular pitch systems.

While the embodiment shown is of a two-bladed wind turbine design, it will be understood that the invention may equally apply to wind turbines having any number of partial pitch blades, e.g. a three-bladed partial pitch wind turbine.

Figure 4:
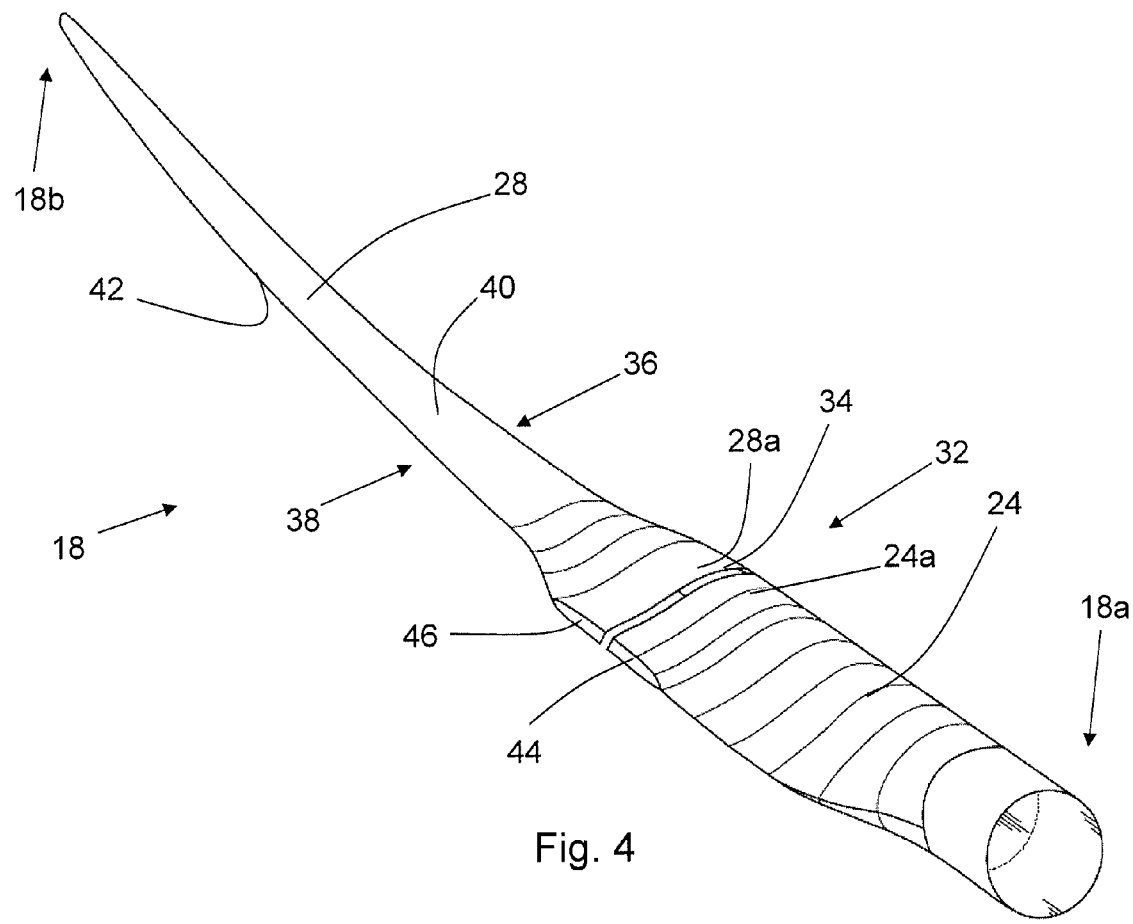
FIG. 4 is a perspective view of a wind turbine blade according to the invention for use in the wind turbine of FIG. 3.

FIG. 4 shows a partial pitch wind turbine blade 18, having root end 18a and tip end 18b, and inner and outer blade sections 24,28. As described in reference to FIG. 3, the blade sections 24,28 are coupled together at a pitch junction (indicated at 32), wherein the pitch junction end 24a of the inner blade section 24 and the pitch junction end 28a of the outer blade section 28 are coupled to a pitch system 34, allowing the outer blade section 28 to be pitched relative to the inner blade section 24.

The blade 18 comprises an aerodynamic blade profile, having a leading edge indicated at 36 (which generally faces into the wind) and a trailing edge indicated at 38 (which generally faces away from the wind). The upper surface of the blade 18 is the suction side of the blade 18 (indicated at 40), and the lower surface of the blade is the pressure side (indicated at 42). During rotation of the blade 18, the pressure side 42 will be on the relatively high pressure side of the blade body, with the suction side 40 exposed to a lower air pressure than the pressure side 42.

The blade 18 comprises a truncated blade profile in the region of the pitch junction 32. The inner blade section 24 comprises a truncated trailing edge 44 adjacent the pitch junction 32, and the outer blade section comprises a truncated trailing edge 46 adjacent the pitch junction 32. The truncations 44,46 provided at the pitch junction 32 ensure that a trailing edge gap between the trailing edges of the adjacent blade section 24,28 is not formed when the outer blade section 28 is pitched, at least for an initial range of pitch angles.

Figure 5:
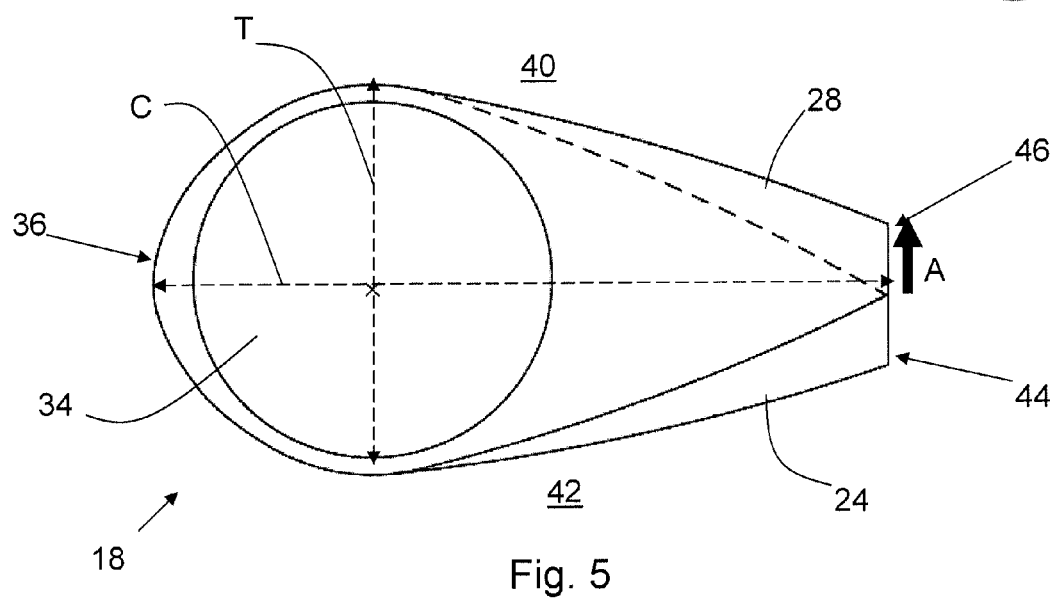
FIG. 5 is a cross-sectional view of the pitch junction of the blade of FIG. 4 when pitched.

With reference to FIG. 5, a cross-section of the blade 18 is shown at the pitch junction 34, when the outer blade section 28 is pitched relative to the inner blade section 24. The truncated trailing edges 44,46 are designed such that when the outer blade section 28 is pitched up to a pre-defined maximum angle (in a positive direction as indicated by arrow A), the trailing edges of the adjacent blade profiles will overlap in a longitudinal direction, preventing the formation of a trailing edge gap at the pitch junction 32. This prevents air leakage from occurring at the pitch junction 32 from the pressure side 42 of the blade 18 to the suction side 40. The pre-defined angle is typically between 4 and 12 degrees, for example between 6 and 10 degrees or 8 degrees.

The truncated surfaces 44,46 may be designed to be such a height that the blade profiles overlap to prevent trailing edge gaps for any typical pitch angle of the outer blade section 28 under normal operation. Optionally, the truncated surfaces 44,46 are dimensioned to ensure that no trailing edge gaps are formed for an initial pre-defined range of pitch angles, i.e. the most likely pitch angles to be used during turbine operation. Alternatively, the pitch angle may be limited by such maximum pre-defined angle under normal operation. The pre-defined angle is typically between 4 and 12 degrees, for example between 6 and 10 degrees or 8 degrees. The ranges of pitch angles are in positive as well as negative direction.

The wind turbine blade profile comprises a chord length C from the leading edge 36 to the trailing edge 38,44,46, and a maximum thickness T (generally located towards the leading edge 36 of the profile). The truncation of the profile is generally performed on blades with a ratio of T/C is at least 20%, e.g. a profile having a thickness of approximately 1 metre and a chord length of approximately 5 metres.

In one example, a truncated airfoil profile provided at the pitch junction comprises a chord length of between approximately 4-5 metres at said pitch junction, wherein the height of the truncated trailing edge surface end of said profile is at least 30 centimetres at said pitch junction. Such an embodiment ensures that no trailing edge gaps are formed for pitch angles of between −8 to +8 degrees, which provides a range of pitch angles which covers the majority of total energy production for that particular wind turbine.

In the embodiment shown in FIG. 4, the outer blade section 28 comprises a tapered transition zone which transitions from the relatively long chord length of the truncated portion 46 of the inner blade section 28 adjacent the pitch junction 32, and the relatively short chord length of the remainder of the outer blade section 28 extending towards the tip end 18b of the blade 18. At the inner blade section 24, the blade 18 has substantially the same chord length along most of the length of the inner blade section 24, away from the circular root end 18a. The chord length at the truncated portion 44 is substantially equivalent to the chord length on the adjacent untruncated portion. It will be understood that other embodiments of the invention may utilise alternate designs of truncation, and may or may not comprise transition zones between portions of the blade having different chord lengths, depending on the desired configuration of blade design.

In an alternate embodiment, the truncation of the trailing edge may be applied to only one of the blade section 24,28, i.e. the inner blade section 24 is truncated and the outer blade section 28 is not, or vice versa. In such a case, the trailing edge of the untruncated blade section extends beyond the truncated trailing edge of the truncated blade section. The truncation is arranged such that a trailing edge gap will not be formed when the outer blade section is pitched, at least for an initial range of pitch angles.

As seen in FIG. 4, the truncated sections of the blade 18 extend along a portion of the blade trailing edge 38 a short distance from the pitch junction 32. For example, the truncated trailing edges extend from the pitch junction 32 a distance substantially equivalent to at least approximately 10% of the length of the blade section in question. In a further alternative, the truncated trailing edge may extend along the entire length of the trailing edge of the inner blade section 24.

Figure 6:
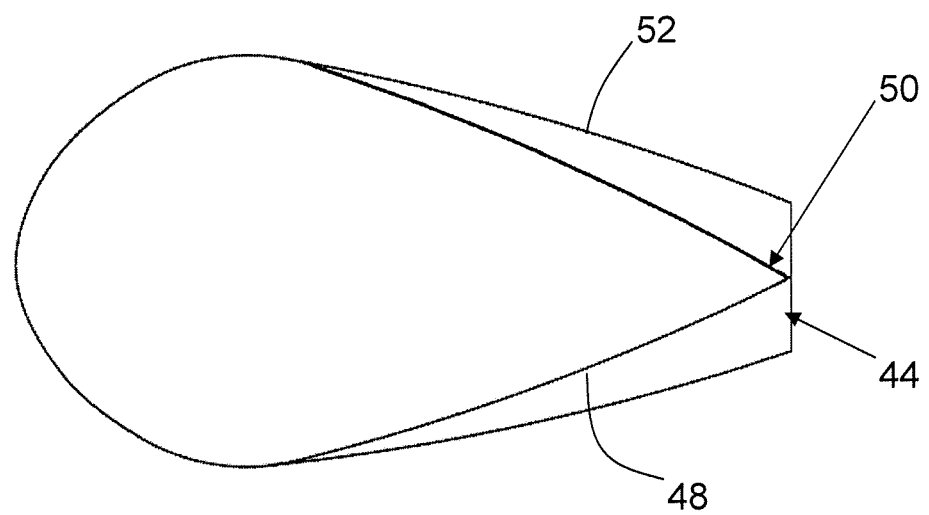
FIG. 6 is a cross sectional profile of a basis blade surrounded by a shell member to provide a truncated trailing edge.

As illustrated in FIG. 6, the blade may be provided as a basis blade 48 with a sharp trailing edge 50 and without a truncated trailing edge and a shell member 52 or fairing around one or both of said inner and outer blade sections at said pitch junction. The shell member 52 may be shaped to present an aerodynamic profile at the pitch junction with a truncated trailing edge (44, 46). The advantage of using such a shell member 52 is that the truncated trailing edge (44, 46) can be retrofitted to existing partial pitch basis blade designs.

The invention provides a new partial pitch blade design which improves wind turbine operational performance. As the truncation is dimensioned to prevent the formation of a trailing edge gap when the outer blade section is pitched, the effect of vortices and air leakage at the pitch junction is reduced, resulting in increased blade efficiency.

The invention is not limited to the embodiment described herein, and may be modified or adapted without departing from the scope of the present invention.

What is claimed is:

1. A partial pitch wind turbine blade of at least 35 meters length, the wind turbine blade having an aerodynamic airfoil profile with a leading edge and a trailing edge, the wind turbine blade comprising:
   an inner blade section; and
   an outer blade section,
   the blade sections coupled at a pitch junction such that the outer blade section is pitchable relative to the inner blade section,
   wherein said inner blade section comprises a truncated airfoil profile provided at said pitch junction, said outer blade section comprises a full airfoil profile portion leading to a truncated airfoil profile portion provided at said pitch junction, wherein the truncated airfoil profiles are provided at the trailing edge of said inner and outer blade sections so that they each provide a truncated trailing edge surface, and wherein said trailing edge is arranged such that the truncated trailing edge surface of said outer blade section projected along a longitudinal axis of the wind turbine blade at least partially intersects the truncated trailing edge surface of the inner blade section when said outer blade section is pitched less than or equal to a pre-defined angle relative to said inner blade section, wherein said pitch is limited to be less than or equal to said pre-defined angle under normal operation in order to prevent the formation of a trailing edge gap at the pitch junction between the trailing edges of the inner and outer blade sections for pitch angles below said pre-defined angle, said pre-defined angle being 8°.

2. The partial pitch wind turbine blade of claim 1, wherein said truncated airfoil profiles are arranged such that, when projected along the longitudinal axis of the wind turbine blade, a surface of a pressure side of a first of said blade sections intersects with a surface of a suction side of a second of said blade sections for a pitch angle of the outer blade section greater than the pre-defined angle, wherein the pitch is limited to less than or equal to the pre-defined angle.

3. The partial pitch wind turbine blade of claim 1, wherein a chord length of the inner blade section at said pitch junction is substantially equal to a chord length of the outer blade section at said pitch junction.

4. The partial pitch wind turbine blade of claim 1, wherein at least one of said truncated airfoil profiles extend from said pitch junction a distance equivalent to between 2% and 50% of the total longitudinal length of said inner or outer blade section.

5. The partial pitch wind turbine blade of claim 4, wherein said at least one truncated profile extends from said pitch junction a distance equivalent to at least 10% of the total longitudinal length of said inner or outer blade section.

6. The partial pitch wind turbine blade of claim 1, wherein at least one of the inner and outer blade sections of the wind turbine blade comprises a basis blade with an untruncated trailing edge and a shell member provided around the untruncated trailing edge of said basis blade at said pitch junction, wherein said shell member forms at least one of the truncated airfoil profile and the truncated airfoil profile portion.

7. The partial pitch wind turbine blade of claim 1, wherein the aerodynamic airfoil profile has a maximum thickness T and a chord length C from the leading edge of the profile to the trailing edge, and wherein the ratio T/C is at least 0.2.

8. The partial pitch wind turbine blade of claim 1, wherein at least one of the inner and outer blade sections of the wind turbine blade comprises a basis blade with an untruncated trailing edge and a shell member provided in a gap between said inner and outer blade sections at said pitch junction, wherein said shell member forms at least one of the truncated airfoil profile and the truncated airfoil profile portion.

9. A wind turbine comprising a wind turbine tower, a nacelle at the top of the tower, and a rotor with a plurality of partial pitch wind turbine blades wherein said partial pitch wind turbine blades comprising:
   an inner blade section; and
   an outer blade section,
   the inner and outer blade sections coupled at a pitch junction such that the outer blade section is pitchable relative to the inner blade section,
   wherein said inner blade section comprises a truncated airfoil profile provided at said pitch junction, said outer blade section comprises a full airfoil profile portion leading to a truncated airfoil profile portion provided at said pitch junction, wherein the truncated airfoil profiles are provided at the trailing edge of said inner and outer blade sections so that they each provide a truncated trailing edge surface, and wherein said trailing edge is arranged such that the truncated trailing edge surface of said outer blade section projected along a longitudinal axis of the wind turbine blade at least partially intersects the truncated trailing edge surface of the inner blade section when said outer blade section is pitched less than or equal to a pre-defined angle relative to said inner blade section, wherein said pitch is limited to be less than or equal to said pre-defined angle under normal operation in order to prevent the formation of a trailing edge gap at the pitch junction between the trailing edges of the blade sections for pitch angles below said pre-defined angle, said pre-defined angle being 8°.

* * * * *